3,164,556
PHOSPHONITRILIC POLYMERS AND PROCESS FOR THEIR PREPARATION
Martin Apley, Altrincham, and James Ranald Alexander, Bolton, England, assignors to The Walker Chemical Co. Limited, Bolton, England, a British company
No Drawing. Filed May 29, 1961, Ser. No. 113,127
14 Claims. (Cl. 260—2)

This invention relates to the production of polymeric substances and to heat-resisting articles made therefrom and their manufacture.

It is known that the reaction of ammonium chloride with phosphorus pentachloride gives rise to mixtures of compounds which are called polyphosphochloronitrides or polyphosphonitrilic chlorides. It is possible to obtain from these mixtures triphosphonitrilic chloride (a cyclic crystalline substance, M.P. 114° C., having the formula $(PNCl_2)_3$), tetraphosphonitrilic chloride (a cyclic crystalline substance, M.P. 123.5° C., having the fomula $(PNCl_2)_4$) and also a mixture of oily linear polyphosphonitrilic chlorides which can be expressed by the formula $(PNCl_2)_n$ where $n$ has an average value which exceeds 4. By heating the aforesaid mixture it is possible to obtain elastomers of the formula $(PNCl_2)_n$, wherein the average value of $n$ is about 300; by further heating it is possible to obtain infusible solids. Such elastomers and infusible solids are of little industrial value.

When the polyphosphonitrilic chlorides obtained by the reaction of ammonium chloride and phosphorus pentachloride are reacted with alcohols, the chlorine groups can be replaced in part by alkoxyl or sustituted alkoxyl, such as aralkoxyl groups and in part by hydroxyl groups.

In this way products can readily be obtained in which the proportion of chlorine remaining, if any, is so low that it can be ignored. The products obtained by this reaction are referred to herein as alkoxylated phosphonitrilic compounds. They may be regarded as having the formula:

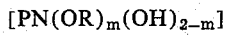

$$[PN(OR)_m(OH)_{2-m}]$$

wherein $m$ has a value fom 0 to 2. R represents a group selected from the group consisting of alkyl groups having 1 to 4 carbon atoms and benzyl groups and $n$ has an average value of 3 or more but generally below 10.

One object of the invention is to obtain from polyphosphonitrilic chlorides polymeric resinous substances containing little or no chlorine. Another object is to obtain polymeric resinous substances which can be thermoset (cured) either by further heating alone or by further heating with formaldehyde or with substances yielding formaldehyde to give products which are stable at high temperatures.

We have now found that alkoxylated phosphonitrilic compounds as defined above, or mixtures thereof, when heated with polybasic inorganic acids, comprising the oxy-acids of phosphorus or the oxy-acids of sulphur, or the oxy-acids of boron or with derivatives, such as the anhydrides of the above oxy-acids, or with alkyl esters or alkyl acid esters of the above oxy-acids or the aryl sulphonic acids or with mixtures of any of these, will react to form polymeric resinous substances which can be cured, as hereinafter explained, either by further heating alone or by further heating with formaldehyde or with substances yielding formaldehyde such as hexamethylene tetramine to give products which are stable at high temperatures. These polymeric resinous substances, whether they are solids or viscous liquids, will be referred to hereinafter as "resins." Since the alkoxylated phosphonitrilic compounds are substantially free from chlorine, no significant amount of hydrogen chloride is evolved from the resins on storing or in further processing.

Thus, alkoxylated phosphonitrilic compounds, especially methoxylated phosphonitrilic compounds (i.e. compounds of the general formula given above wherein R represents a methyl group), will give such resins when heated with phosphoric acid or its anhydride or sulphuric acid (including oleum) or with low alkyl esters of these acids or with aromatic sulphonic acids such as benzene-sulphonic acid or with boric acid or with boric anhydride or with mixtures of any of these.

The invention accordingly provides a process for the production of resins which comprises heating an alkoxylated phosphonitrilic compound as hereinbefore defined, with an oxy-acid of phosphorus or sulphur or boron or with a derivative or alkyl ester or alkyl acid ester thereof or with an arylsulphonic acid or with mixtures of any of these. The invention also includes the polymeric substances obtained by this process. There may be used mixtures of the oxy-acids or derivatives and of the anhydrides of the oxy-acids.

The reaction takes place when the reactants are simply heated together, with or without a solvent, at a temperature above 100° C., preferably from 130 to 220° C. The resulting polymeric substance, when formed at a temperature not exceeding 220° C. is a thermoplastic resin which, on heating to a higher temperature, preferably above 250° C., becomes thermoset. This thermosetting is commonly referred to as curing. The time required for curing depends upon the temperature of curing and the exact nature of the reagents used to make the polymeric substance. The higher the temperature, the shorter will be the time required for curing.

Preferably the alkoxylated phosphonitrilic compound or a mixture of such compounds is added to the other reactant in small portions.

The thermoplastic resins of the present invention, dissolved in solvent or not, may be mixed with reinforcing materials or fillers such as glass fibre, asbestos fibre, mica or aluminium powder to give, when cured, useful mouldings, laminates, surface coatings or bonding agents having exceptional resistance to heat. In many cases, water may be used as the solvent. Such cured products exhibit resistance to temperatures up to, and sometimes above, 600° C. without undue deformation, cracking or crumbling. Sheets, tubes or rods can be moulded for applications in which resistance to very high temperatures is required.

The invention includes the process for the manufacture of heat-resisting articles which comprises curing a resin obtained by the process of the invention by heating it to a temperature sufficient to thermo-set it. It also includes the resins and heat-resisting articles made by the process of the invention.

The formation of the thermoplastic resin and its curing can be effected in a single operation by mixing the components of the resin with the reinforcing materials and heating the mixture to a temperature above 250° C., preferably in a mould. Usually, however, the preparation and curing are carried out separately.

Formaldehyde or a substance yielding formaldehyde may be incorporated in the materials to be cured.

The invention will be illustrated by but is not limited to the examples which follow. After the examples are given some preparations of the alkoxylated phosphonitrilic compounds which can be used to give resins by heating with polybasic inorganic acids or derivatives thereof, in the manner illustrated in the examples. In the preparations and examples all parts are by weight.

EXAMPLE 1

98 parts of concentrated sulphuric acid (98% w./w.)

were heated to 140° C. and over a period of ½ hour 86 parts of the methoxylated phosphonitrilic compound as described in Preparation 2 were added. The temperature was maintained at 140° C. during the addition and was then raised to 190° C. and held at this temperature for 3 hours. A white pasty resin was obtained when cooled. The resin was soluble in water.

EXAMPLE 2

109 parts of 90% syrupy phosphoric acid (S.G. 1.75) were heated at 140° C. and over a period of one hour, 86 parts of the methoxylated phosphonitrilic compound obtained by Preparation No. 2 below were added gradually in small portions. The temperature was maintained at 140° C. during the addition of the compound and was then raised to 190° C. and maintained at this temperature for 3½ hours. A clear pale brown coloured syrup was obtained which set to a pasty resin on cooling. This resin was soluble in water. It could be thermo-set to a black rubbery solid by heating on a hot-plate at 400° C. for 2 hours.

EXAMPLE 3

184 parts of pyrophosphoric acid were heated until molten and 110 parts of methoxylated phosphonitrilic compound were then added at a temperature of 140° C. The mixture was maintained at 190–200° C. for 3 hours and then allowed to cool. The product was a dark brown viscous liquid which, when suitably filled with asbestos and moulded at a temperature sufficient to thermo-set it, gave mouldings possessing useful mechanical properties after exposure to elevated temperatures.

EXAMPLE 4

225 parts of ethyl phosphate were mixed with 110 parts of methoxylated phosphonitrilic compound and heated with stirring, the temperature of the mixture being raised to 195° C. and maintained there for 3 hours; during this heating a liquid, mainly ethyl alcohol, was collected by distillation from the reaction mixture.

The product, on cooling, was a yellow viscous liquid whose heat-resisting properties when cured, were demonstrated as in Example 3.

EXAMPLE 5

266 parts of dimethyl sulphate and 110 parts of methoxylated phosphonitrilic compound were mixed and reacted together in the manner described in Example 4. The product was a dark viscous liquid, forming a crystalline mass on cooling. This material, when suitably filled and moulded at a temperature sufficient to thermo-set it, gave mouldings having heat-resistant properties.

EXAMPLE 6

To benzenesulphonic acid prepared by mixing 190 parts of the sodium salt of benzenesulphonic acid, 150 parts of water and 92 parts of concentrated sulphuric acid were added 29 parts of methoxylated phosphonitrilic compound. The reactants were heated at 195° C. for 3 hours. While the mixture was still warm the dark liquid was decanted from the solid inorganic mass; this liquid formed on cooling, a black solid which had useful heat-resistant properties when cured as described in previous examples.

EXAMPLE 7

To 80 parts of oleum (containing 18% of sulphur trioxide) were added 55 parts of methoxylated phosphonitrilic compound and the mixture was stirred at 195° ±5° C. for 3 hours. The product was a brown viscous liquid which became solid on standing. This product, when suitably filled with asbestos and moulded at a temperature sufficient to thermo-set it, gave mouldings possessing useful mechanical properties after exposure to elevated temperatures.

EXAMPLE 8

Benzene meta-disulphonic acid was prepared by mixing 100 parts of sodium benzene meta-disulphonate, 100 parts of water and 92 parts of concentrated sulphuric acid; 20 parts of methoxylated phosphonitrilic compound were added and the mixture heated as described in Example 7. The product was a grey solid which, when moulded at a sufficient temperature to thermo-set it, gave useful mouldings.

EXAMPLE 9

79 parts of boric acid and 110 parts of methoxylated phosphonitrilic compound were mixed in the dry state and then heated; when molten the reaction mixture was heated at 160–180° C., with stirring for 3 hours. After cooling, the product was a grey solid, soluble in water, which, when moulded at a temperature sufficient to thermo-set it, gave useful mouldings which retained their strength after exposure to elevated temperatures.

EXAMPLE 10

To 110 parts of methoxylated phosphonitrilic compound was added 126 parts of a mixture of phosphorus pentoxide and phosphoric acid, made by adding 90.5 parts of phosphorus pentoxide to 100 parts of phosphoric acid. The reactants formed a clear liquid on heating and this was maintained at 180°–190° C. for 3.5 hours. When cool the product was a viscous syrup which, when mixed with a suitable filler and moulded at a temperature sufficient to thermo-set it, gave useful mouldings.

EXAMPLE 11

To 80 parts of phosphoric acid was added 174 parts of oleum (containing 20% free sulphur trioxide), and considerable heat was evolved; to this mixture was added 175 parts of methoxylated phosphonitrilic compound and the preparation continued as in Example 1. The product was a viscous syrup which, when moulded at a temperature sufficient to thermo-set it, gave useful mouldings.

EXAMPLE 12

To 277 parts of syrupy phosphoric acid were added 110 parts of methoxylated phosphonitrilic compound together with 125 parts of ethoxylated phosphonitrilic compound (prepared as in Preparation 4). The reactants were heated together whilst stirring at 195° C. for 3 hours. The product was a viscous syrup which did not solidify on cooling. This resin, when suitably filled and moulded at a temperature sufficient to thermo-set it, gave mouldings having good physical properties.

EXAMPLE 13

To 325 parts of ethyl sulphate was added 125 parts of ethoxylated phosphonitrilic compound (prepared as in Preparation 4); the mixture was heated at (approximately) 180° C. for 2.5 hours when a black resin was obtained; this resin, when moulded at a temperature sufficient to thermo-set it, gave useful mouldings.

EXAMPLE 14

To 128 parts of butoxylated phosphonitrilic compound (prepared as in Preparation 5), was added 160 parts of oleum (containing 20% of free sulphur trioxide). The mixture was stirred and heated at approximately 190° C. for 3 hours and on cooling a dark viscous product was obtained. This resin, when suitably filled and moulded at a temperature sufficient to thermo-set it, gave mouldings having useful physical properties.

EXAMPLE 15

140 parts of syrupy phosphoric acid was mixed with 143 parts of benzyloxylated phosphonitrilic compound (prepared as in Preparation 8) and the mixture was treated as in Example 1. The product was a viscous yellow syrup which, when moulded at a temperature sufficient to thermo-set it, gave useful mouldings.

EXAMPLE 16

50 parts of the resin prepared as in Example 15 were dissolved in 50 parts of cold water. The solution was used to impregnate 50 parts of asbestos fibre in the form of a ¼" thick felt supported in an enamelled tray. The impregnated asbestos sheet was dried at 50° C. for 12 hours. The sheet was cut into strips 8" x 1" and a pack of eight strips was laid up and pressed at 1500 lbs. per sq. in. pressure for 30 minutes at 300° C. The laminate obtained was cooled before removing from the mould and was conditioned at room temperature for 24 hours. A cross-break strength of 25,600 lbs./sq. in. was obtained.

Two more asbestos reinforced laminates were prepared as in this example. One laminate was tested and gave a cross-break strength of 24,200 lbs./sq. in. The second laminate was placed directly in an electric furnace at 500° C. After 50 hours exposure at this temperature the laminate was removed and allowed to cool and condition at room temperature for 24 hours. The cross-break strength was found to be 19,200 lbs./sq. in.

Two more asbestos reinforced laminates were prepared as in this example. One laminate was tested and gave a cross-break strength of 22,100 lbs./sq. in. The other laminate was placed directly in an electric furnace at 800° C. After 50 hours exposure at this temperature the laminate was removed and allowed to cool and condition at room temperature for 24 hours. The cross-break strength was found to be 3,800 lbs./sq. in. and the specimen showed neither delamination nor any obvious deformation.

Two more asbestos reinforced laminates were prepared as in this example. One laminate was tested and gave a cross-break strength of 23,700 lbs./sq. in. The other laminate was placed in boiling water for 3 hours and on removal was allowed to condition for 24 hours at room temperature. The cross-break strength of the treated laminate was 18,200 lbs./sq. in.

Preparation 1

108 parts of the mixed phosphonitrilic chlorides obtained by the reaction of ammonium chloride and phosphorus pentachloride (under such conditions that the product was of such low molecular weight that it is soluble in tetrachlorethane) were refluxed for 3 hours with 62 parts of methanol. A white solid, methoxylated phosphonitrilic compound was precipitated, filtered and dried.

Preparation 2

108 parts of the phosphonitrilic chlorides obtained as described in Preparation No. 1 were dissolved in 108 parts of tetrachlorethane by warming to 50° C. 62 parts of methanol were added and the mixture was refluxed for 3 hours. A further 31 parts of methanol were then added. The mixture was refluxed for a further 2 hours and the solvent was then removed under vacuum leaving a white solid methoxylated phosphonitrilic compound which was dried at 80–90° C.

The solvent used in the above method could be replaced by benzene, tetrahydrofuran, trichlorethylene or other suitable solvent.

Preparation 3

50 parts of the phosphonitrilic chlorides obtained as described in Preparation No. 1 were dissolved in 50 parts of methyl ethyl ketone by warming to 40° C. 129 parts of a 36% w./w. solution of sodium methoxide in methanol were slowly added, and the mixture refluxed for 1½ hours at atmospheric pressure. Volatile matter was then removed under reduced pressure and sodium chloride was removed by treating the mixture with 50 parts of cold water and filtering. The residue of methoxylated phosphonitrilic compound was washed with ether and dried giving a brown oily paste.

Preparation 4

This preparation was carried out as in Preparation No. 2, but replacing the methanol by 88.6 and 43.3 parts of ethanol. The ethoxylated phosphonitrilic compound obtained was a white powder soluble in water.

Preparation 5

This preparation was carried out as in Preparation No. 2, but replacing the methanol by 143.2 and 71.6 parts of normal butanol. The butoxylated phosphonitrilic compound obtained was a brown solid which is soluble in water.

Preparation 6

108 parts of the crystalline trimer of phosphonitrilic chloride were dissolved in 108 parts of trichlorethylene by warming to 50° C. Methanol was added as in Preparation No. 2 and the subsequent operations were followed as in that preparation. The methoxylated phosphonitrilic compound obtained was a white, deliquescent solid, soluble in water.

Chlorine estimation of the products of the foregoing preparations by the method described in Kunststoffe, 41, 192–3 (1951) gave a negative result.

Preparation 7

1290 parts of crude phosphonitrilic chloride were dissolved in 1290 parts of tetrachlorethane by heating to 80° C.; after cooling slightly a total of 1066 parts of methyl alcohol were added dropwise with stirring during 4.5 hours, the temperature of the reaction mixture being maintained at 65–75° C. throughout. After removal of solvent a grey-white solid was obtained which was used for the preparation of resins.

Preparation 8

644 parts of crude phosphonitrilic chloride were added to 644 parts of tetrachlorethane and were dissolved by warming and stirring. To the solution were added 900 parts of benzyl alcohol and the mixture was heated at 100° C. for 3 hours; a further 900 parts of benzyl alcohol were then added and the mixture was refluxed for a further 2 hours, a vigorous reaction occurring. After removal of solvents the solid product could be used for the preparation of resins as typified by Example 15 above.

Other alkoxylated phosphonitrilic compounds could be obtained by the reaction employed in the foregoing preparations, by using other alcohols such as ethylene glycol or glycerol.

The invention has been described in detail with reference to some preferred embodiments in the foregoing specification and examples but it will be understood that the invention is not limited thereto but is of the scope of the appended claims.

We claim:

1. Process for the production of a polymeric resinous substance which comprises the steps of (1) adding a polyphosphonitrilic compound having the formula:

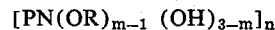

$$[PN(OR)_{m-1}(OH)_{3-m}]_n$$

wherein R represents a group selected from alkyl groups having 1 to 4 carbon atoms and benzyl groups, $m$ represents an integer from 1 to 3 and $n$ has an average value from 3 to 10; to a compound selected from the group which consists of orthophosphoric acid, orthophosphoric acid anhydride, sulphuric acid, alkyl esters of phosphoric acid and of sulphuric acid, aromatic sulphonic acids, boric acid, boric anhydride, and a mixture of at least two members selected from the group which consists of orthophosphoric acid, orthophosphoric acid anhydride, sulphuric acid, alkyl esters and alkyl acid esters of phosphoric acid and of sulphuric acid, aromatic sulphonic acids, boric acid and boric anhydride, to form a mixture, and (2) heating said mixture to a temperature of from 100 to 220° C. for about 3 hours to effect reaction between the components of said mixture to produce a polymeric resinous substance.

2. Process for the production of a polymeric resinous substance which comprises the steps of (1) adding a methoxylated phosphonitrilic compound having the formula $$[PN(OMe)_{m-1} (OH)_{3-m}]_n$$

wherein $m$ represents an integer of from 1 to 3, $n$ has an average value from 3 to 10, and Me represents a methyl group to orthophosphoric acid to form a mixture, and (2) heating said mixture to a temperature of from 100 to 220° C. for about 3 hours to effect reaction between the components of said mixture to produce a polymeric resinous substance.

3. Process for the production of a polymeric resinous substance which comprises the steps (1) adding a methoxylated phosphonitrilic compound having the formula:

$$[PN(OMe)_{m-1} (OH)_{3-m}]_n$$

wherein $m$ represents an interger of from 1 to 3, $n$ has an average value from 3 to 10, and Me represents a methyl group to sulphuric acid to form a mixture, and (2) heating said mixture to a temperature of from 100 to 220° C. for about 3 hours to effect reaction between the components of said mixture to produce a polymeric resinous substance.

4. Process for the production of a polymeric resinous substance which comprises the steps of (1) adding a methoxylated phosphonitrilic compound having the formula:

$$[PN(OMe)_{m-1} (OH)_{3-m}]_n$$

wherein $m$ represents an integer of from 1 to 3, $n$ has an average value from 3 to 10, and Me represent a methyl group to a first mixture of an oxy acid selected from the group which consists of sulphuric acid and orthophosphoric acid and an anhydride of an oxy-acid selected from the group which consists of sulphuric acid and phosphoric acid to form a second mixture, and (2) heating said second mixture to a temperature of from 100 to 220° C. for about 3 hours to effect reaction between the components of the said second mixture to produce a polymeric resinous substance.

5. The polymeric resinous substance which results from the steps of (1) adding a methoxylated phosphonitrilic compound having the formula:

$$[PN(OMe)_{m-1} (OH)_{3-m}]_n$$

wherein $m$ represents an integer of from 1 to 3, $n$ has an average value from 3 to 10, and Me represents a methyl group to ortho-phosphoric acid to form a mixture, and (2) heating said mixture at a temperature of from 130 to 220° C. for about 3 hours to effect reaction between the components of said mixture.

6. Process for the manufacture of a heat-resisting article which comprises heating a substance selected from the group consisting of the polymeric resinous substance defined in claim 1 and the polymeric resinous substance defined in claim 1 mixed with a filler, said substance being in the shape of the article to a temperature above 250° C. for about 3 hours.

7. Process for the manufacture of a heat-resisting article which comprises heating a substance selected from the group consisting of the polymeric resinous substance defined in claim 5 and the polymeric resinous substance defined in claim 5 mixed with a filler, said substance being in the shape of the article to a temperature above 250° C. for about 3 hours.

8. Process for the manufacture of a heat-resisting article which comprises heating a substance selected from the group consisting of the polymeric resinous substance defined in claim 3 and the polymeric resinous substance defined in claim 3 mixed with a filler, said substance being in the shape of the article to a temperature above 250° C. for about 3 hours.

9. Process for the manufacture of a heat-resisting article which comprises heating a substance selected from the group consisting of the polymeric resinous substance defined in claim 4 and the polymeric resinous substance defined in claim 4 mixed with a filler, said substance being in the shape of the article to a temperature above 250° C. for about 3 hours.

10. The polymeric resinous substance which results from the steps of (1) adding a polyphosphonitrilic compound having the formula:

$$[PN(OR)_{m-1} (OH)_{3-m}]_n$$

wherein R represents a group selected from alkyl groups having 1 to 4 carbon atoms and benzyl groups, $m$ represents an integer from 1 to 3 and $n$ has an average value from 3 to 10; to a compound selected from the group which consists of orthophosphoric acid, orthophosphoric acid anhydride, sulphuric acid, alkyl esters of phosphoric acid and of sulphuric acid, aromatic sulphonic acids, boric acid, boric anhydride, and a mixture of at least two members selected from the group which consists of orthophosphoric acid, orthophosphoric acid anhydride, sulphuric acid, alkyl esters and alkyl acid esters of phosphoric acid and of sulphuric acid, aromatic sulphonic acids, boric acid and boric anhydride, to form a mixture, and (2) heating said mixture to a temperature of from 100 to 220° C. for about 3 hours to effect reaction between the components of said mixture to produce a polymeric resinous substance.

11. A molding composition comprising a mixture of the polymeric resinous substance claimed in claim 10 and a reinforcing filler.

12. A molding composition comprising a mixture of the polymeric resinous substance claimed in claim 2 and a reenforcing filler.

13. A molding composition comprising a mixture of the polymeric resinous substance claimed in claim 3 and a reenforcing filler.

14. A molding composition comprising a mixture of the polymeric resinous substance claimed in claim 4 and a reenforcing filler.

References Cited in the file of this patent

UNITED STATES PATENTS 2,214,769    Lipkin _____ Sept. 17, 1940

OTHER REFERENCES

Patat et al.: Chemical Abstracts, vol. 45, page 6425 (1951).